(12) United States Patent
Slim

(10) Patent No.: US 6,457,178 B1
(45) Date of Patent: Sep. 24, 2002

(54) PULSE WIDTH MODULATOR FOR COMMUNICATION SYSTEM INCLUDING FIBER OPTIC COMMUNICATIONS

(75) Inventor: David H. Slim, Douglasville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/040,008

(22) Filed: Mar. 17, 1998

(51) Int. Cl.⁷ .............................................. H04N 7/173
(52) U.S. Cl. ........................ 725/127; 725/129; 725/149; 359/125; 359/186
(58) Field of Search ................................. 725/127, 129, 725/118, 119, 149; 359/125, 184, 186; 375/238; 332/109, 110; H04N 7/173, 7/16; H04J 14/02; H04B 10/04

(56) References Cited

U.S. PATENT DOCUMENTS

| | | |
|---|---|---|
| 3,590,250 A | 6/1971 | Witkover |
| 4,140,980 A | 2/1979 | Cummings |
| 4,470,068 A | 9/1984 | Plume |
| 4,669,089 A * | 5/1987 | Gahagan et al. ............ 375/146 |
| 4,694,504 A | 9/1987 | Porter et al. |
| 4,713,841 A | 12/1987 | Porter et al. |
| 4,776,036 A | 10/1988 | Hulsey et al. |
| 4,896,372 A | 1/1990 | Weaver |
| 5,040,242 A * | 8/1991 | Tsuchiya et al. ............ 359/154 |
| 5,052,037 A | 9/1991 | Perelman |
| 5,349,461 A | 9/1994 | Huynh et al. |
| 5,373,387 A | 12/1994 | Bosch et al. |
| 5,408,351 A | 4/1995 | Huang |
| 5,448,629 A | 9/1995 | Bosch et al. |
| 5,469,287 A | 11/1995 | Iwakuni |
| 5,544,161 A * | 8/1996 | Bigham et al. ............. 370/397 |

* cited by examiner

*Primary Examiner*—Andrew Faile
*Assistant Examiner*—Andrew Y. Koenig
(74) *Attorney, Agent, or Firm*—Hubert J. Barnhardt, III; Kenneth M. Massaroni; Shelley L. Couturier

(57) ABSTRACT

A cable television system (100) includes a head end section (105) for processing information provided from subscriber equipment via a reverse path within the system (100). The reverse signal is provided from subscriber equipment in the form of a broadband RF signal, which can include voice, data, and/or video information. The broadband RF signal is provided from a plurality of subscribers to a node (200) that pulse width modulates the RF signal to generate a reverse optical signal. The pulse width modulated optical signal is then provided to the head end section (105) for processing to recover the information contained therein.

12 Claims, 3 Drawing Sheets

100

PULSE WIDTH MODULATOR FOR COMMUNICATION SYSTEM INCLUDING FIBER OPTIC COMMUNICATIONS

FIELD OF THE INVENTION

This invention relates generally to cable television systems, and more specifically to nodes that are used within such systems to process both optical and radio frequency signals.

BACKGROUND OF THE INVENTION

Cable television systems typically include a head end section that receives satellite signals and demodulates the signals to baseband. The baseband signal is then converted to an optical signal for transmission from the head end section, such as over fiber optic cable. Cable systems also usually include one or more hubs for splitting the signals into a plurality of branches for transmission to various geographical regions within a system. Optical nodes situated within the system convert the optical signals to radio frequency (RF) signals for further transmission, such as over coaxial cables, to system subscribers. Taps are situated along the coaxial cable to provide subscriber "drops" that tap off signals to subscriber premises.

In cable television systems having two-way communication capabilities, RF signals are transmitted in the reverse direction from system subscribers. These signals can include any or all of voice, video, or data information, resulting in a composite broadband RF signal that is received by an optical node. The node must then convert this RF signal into an optical signal for transmission back to the head end section.

Typically, the optical nodes that, in the forward direction, split the outgoing optical signal into a number of RF signals also contain a relatively inexpensive, robust laser for such reverse transmissions. Such optical nodes can, for instance, be mounted on utility poles and exposed to a range of environmental conditions; therefore the laser must be suitable for outdoor use. These simple lasers ordinarily use linear modulation to process the RF signals that are to be transmitted in the reverse direction. However, linear modulation of broadband RF signals can cause clipping of the signal and overloading of the laser, resulting in an excessively noisy signal that may be erroneously decoded at the head end section.

Thus, what is needed is a better way of optically processing a broadband RF signal for transmission to the head end section in the reverse direction.

DETAILED DESCRIPTION OF A PREFERRED EMBODIMENT

Figure 1:
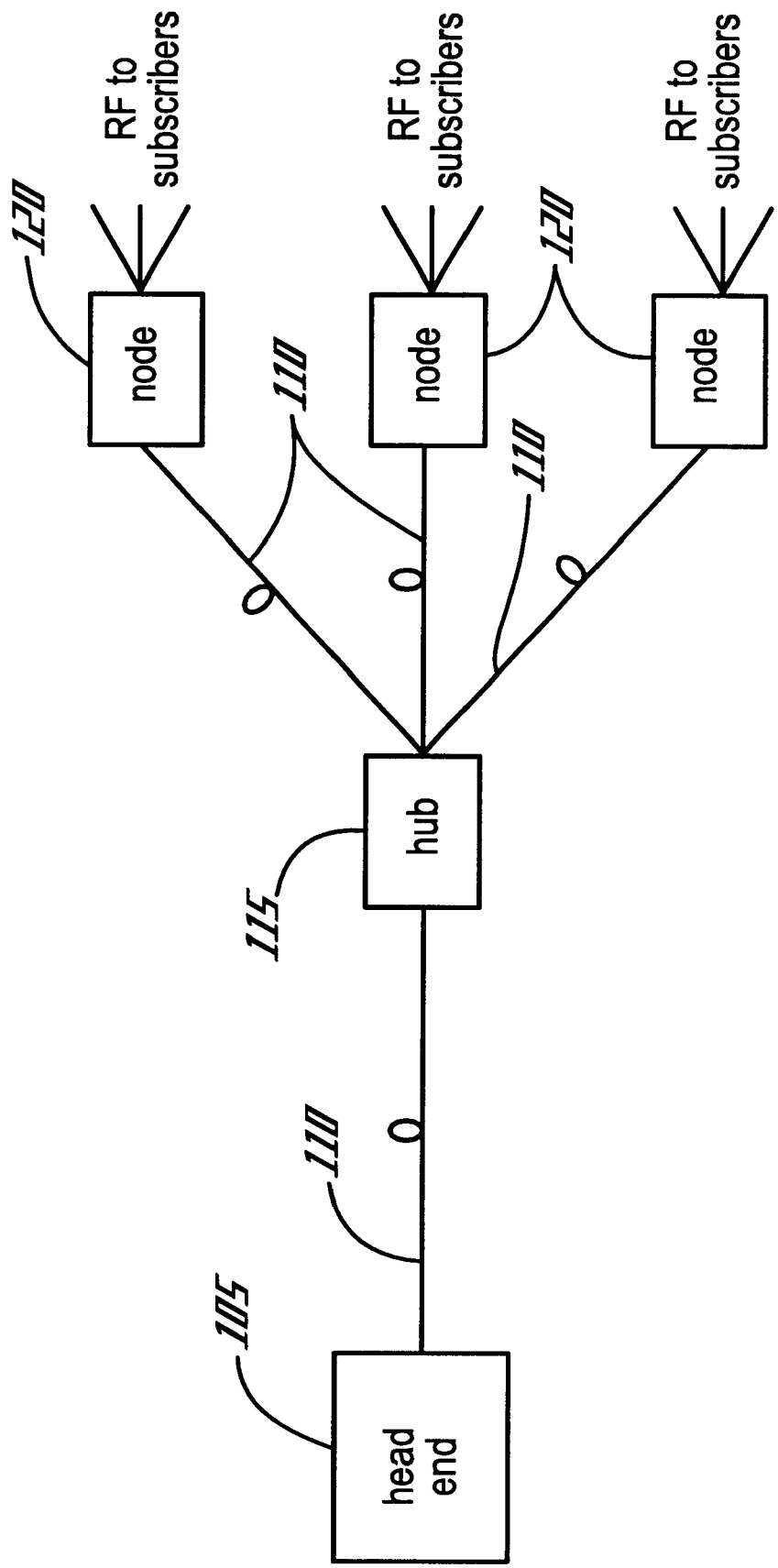
FIG. 1 is an illustration of a conventional cable television system.

Referring to FIG. 1, a communication system, such as a cable television system 100, is shown. The system 100 includes a head end section 105 for receiving satellite television signals, demodulating the signals down to baseband, and transmitting the signals over the system 100 in the forward direction, i.e., from the head end section 105 to system subscribers. The transmitted signals can, for instance, be radio frequency (RF) signals, although they are more preferably optical signals that are transmitted over a communication medium such as fiber optic cable 110. Because cable systems can deliver service to a large number of subscribers, hubs 115 can be located remotely from the head end section 105 for splitting the forward optical signal into a plurality of forward signals for continued transmission in the forward direction. The optical signals are then processed by optical nodes 120, which convert the forward optical signals into RF signals that are thereafter routed to subscriber equipment (not shown) over other media, such as coaxial cables. Taps (not shown) are usually included within the cable system 100 for providing subscriber drops that couple forward RF signals to subscriber equipment.

More recently, cable television systems have been designed to process signals in the reverse direction, i.e., from subscriber equipment back to the head end section 105, as well as in the forward direction. This is preferably accomplished over the same communication media, e.g., fiber optic cables and coaxial cables, so that entirely new and separate systems are not required. Signals in the reverse path can comprise voice, data, and/or video information and can originate from such subscriber equipment as digital and analog set top devices, computers, cable modems, and telephones. As a result, the reverse signal is generally a broadband RF signal. For instance, the reverse broadband signal could comprise a composite voice, video, and data signal spanning from 5 megahertz (MHz) to 40 MHz.

A signal having these characteristics cannot be easily modulated using reverse path techniques that are conventionally used in cable television systems. More specifically, optical sources that are conventionally included within the nodes 120 for processing reverse signals usually comprise relatively inexpensive, simple lasers that linearly modulate the incoming RF signal to create a reverse optical signal. When processing a broadband RF signal with the laser of the conventional node 120, however, clipping of the signal and overloading of the laser can result in an excessively noisy signal that may be erroneously decoded by the head end section 105. On the other hand, use of an inexpensive, simple laser is desirable because such lasers are required in large quantities and are typically mounted outdoors and exposed to a variety of different environmental conditions. Therefore, a simple, robust laser is, according to the present invention, driven by an incoming RF signal to generate a pulse width modulated optical signal that can be easily and reliably decoded at the head end section 105.

Figure 2:
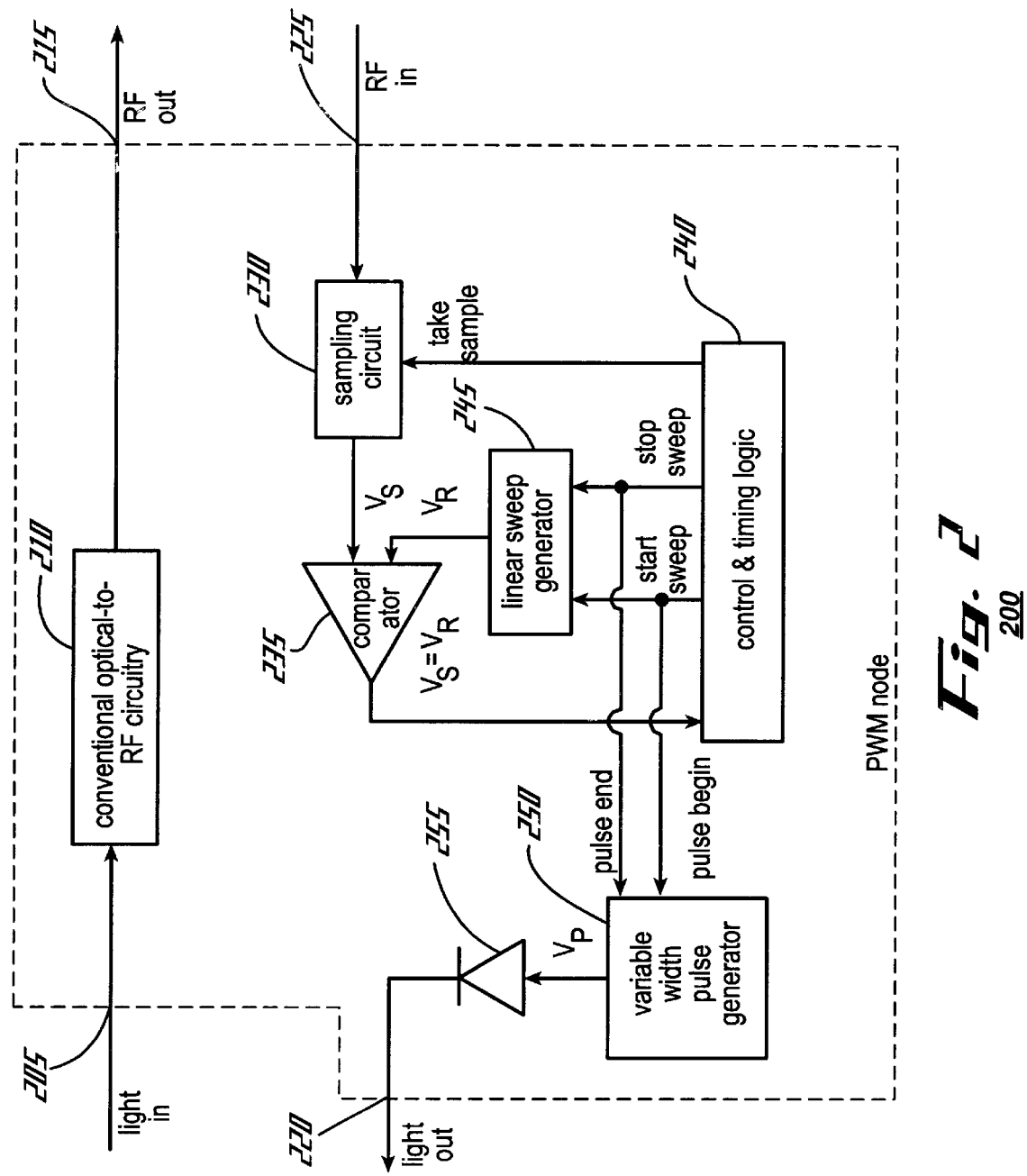
FIG. 2 is an electrical block diagram of a pulse width modulation (PWM) node that processes broadband RF signals in accordance with the present invention.

FIG. 2 is an electrical block diagram of a pulse width modulation (PWM) node 200 that is used, according to the instant invention, in a two-way communication system, such as a cable television system that processes both forward and reverse signals. The PWM node 200 can, for example, be substituted for any or all of the nodes 120 of FIG. 1. In the forward path, the node 200 includes a port 205 for receiving the forward optical signal and a converter, i.e., conventional optical-to-RF circuitry 210, for converting the optical signal to an RF signal that is distributed to further components, such as amplifiers and taps, within the cable television system. The forward RF signal exits the node 200 at the outgoing port 215.

The PWM node 200 further includes circuitry for processing signals in the reverse direction. More specifically, the reverse broadband RF signal is received at an incoming port 225 and provided to an input of a PWM circuit that comprises a sampling circuit 230 for sampling the broadband signal as commanded by control and timing logic 240, which can, for instance, include a conventional clock circuit. The sampling circuit 230 provides an output signal, $V_S$, that is proportional to the amplitude of the input signal at the sampling time. Preferably, the rate at which the sampling circuit 230 samples the signal is at least one-half the period of the highest frequency component of the incoming broadband signal.

The output of the sampling circuit 230 is provided to a first input of a comparator 235. A second input of the comparator 235 is coupled to an output of a linear sweep generator 245 that provides a signal $V_R$. The signal $V_R$ is preferably a ramp waveform, commencement of which is synchronized with the generation of the sampled signal $V_S$. As the output of the linear sweep generator 245 increases in amplitude, $V_S$ and $V_R$ will, at some point, become equal, at which point the comparator 235 generates an output signal having a predetermined level. The timing of the signals generated by the sampling circuit 230, the linear sweep generator 245, and the comparator 235 is controlled by the logic 240.

The beginning of the rise of the signal $V_R$ and the termination of such rise are used to define the beginning and end, respectively, of a pulse, $V_P$, generated by a variable width pulse generator 250 having inputs coupled to the control and timing logic 240. The output of the variable width pulse generator 250 is therefore a pulse having a duration that is directly proportional to the amplitude of the incoming broadband RF signal. The pulse is coupled to and drives an optical source 255, which can be a simple and inexpensive solid-state laser diode. The optical source 255 is activated, during each sampling interval, to illuminate for a period of time proportional to the amplitude of the broadband RF signal during that sampling interval. In this manner, the reverse broadband RF signal is processed using PWM circuitry to generate a pulse width modulated optical signal.

At the receiving location, such as at the head end section of the cable television system, a photoelectric detector, for example, can be used to convert the reverse optical signal to a train of electrical pulses which are delivered to a low-pass filter. Since the direct current (DC) component of the pulse waveform is proportional to the amplitude of the original signal, the output of the low-pass filter will replicate the reverse broadband RF signal without any of the problems associated with noise generated by use of linear modulation.

Although the node 200 has been described as including incoming ports 205, 225 and outgoing ports 215, 220 associated separately with the forward and reverse signals, such a description. is merely for ease of explanation. It will be appreciated that other schemes for receiving and transmitting signals can alternatively be used. For instance, a single port could be used to both receive the forward optical signal and transmit the reverse optical signal, and a single port could be used to both receive the reverse RF signal and transmit the forward RF signal. Circuits for separating, combining, and filtering signals in such a situation are well known in the art.

It will be further appreciated that variations of the circuitry included within the node 200 could be provided. For example, the linearity of the sweep generator 245 could deviate to compensate for error in the sampling process, and pulses provided to the optical source 255 could be preprocessed to produce sharper activation and deactivation of the optical source 255 and to adapt the pulses to different laser characteristics.

Figure 3:
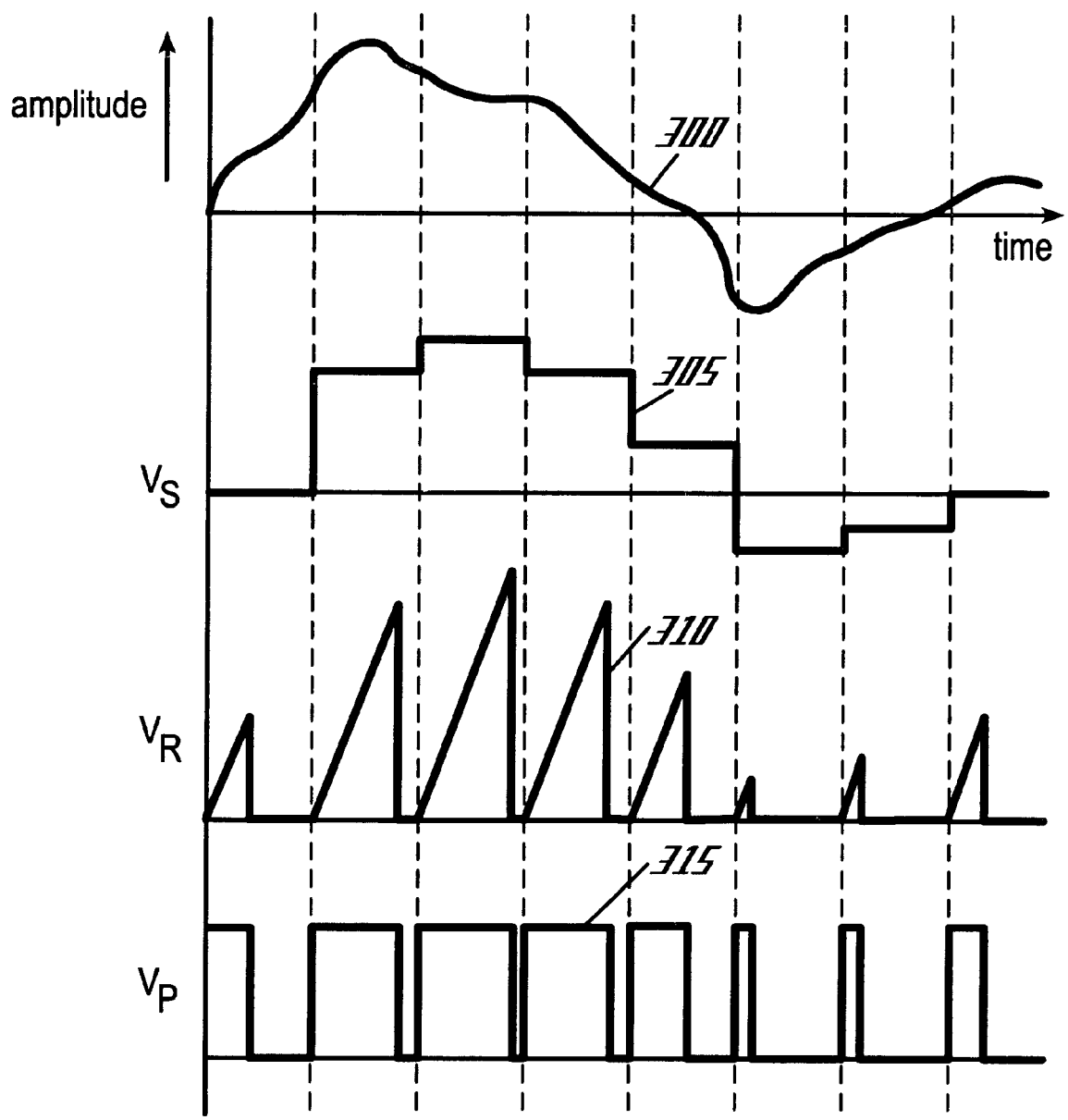
FIG. 3 is a signal diagram depicting signals processed by the PWM node of FIG. 2 in accordance with the present invention.

Referring next to FIG. 3, a signal diagram depicts the signals generated and processed within the reverse path of the optical node 200. Signal 300 is an example of a reverse broadband RF signal received in the reverse direction by the node 200, signal 305 represents the output $V_S$ of the sampling circuit 230, signal 310 represents the output $V_R$ of the sweep generator 245, and signal 315 represents the pulsed output $V_P$ of the variable width pulse generator 250.

Given the example RF signal 300, it can be seen that the sampled signal 305 varies with the RF signal 300 for each sampling interval. The ramped waveform 310 produced by the sweep generator 245 increases in amplitude until its voltage is equal to that of the sampled signal 305, at which time the comparator output goes high, triggering the logic 240 to terminate generation of the ramped waveform 310. The pulsed output 315 of the pulse generator 250 has a duration equal to the duration of the ramped waveform 310 during each sampling interval so that the optical signal generated by the optical source 255 is proportional to the amplitude of the reverse RF signal 300.

In summary, the cable television system described above provides communications in both the forward and reverse directions. Forward direction communications are provided in a conventional manner. However, reverse direction signals are processed by a PWM node 200 configured to provide pulse width modulated signals on the reverse path. These pulse width modulated optical signals can be easily processed to decode information contained therein without errors associated with prior art reverse-path-signal processing. Conventional nodes, conversely, receive broadband RF signals in the reverse direction and process such signals to generate linearly modulated optical signals that can be very noisy and therefore susceptible to error.

It will be appreciated by now that there has been provided a better way to process signals transmitted over a cable television system in the reverse direction.

What is claimed is:

1. A communication system for processing forward and reverse signals, the communication system comprising:
   a node for converting a reverse broadband radio frequency (RF) signal to a reverse optical signal using pulse width modulation of an optical source, wherein the optical source that generates the reverse optical signal having pulses of durations that are proportional to amplitudes of the reverse broadband RF signal, the node comprising:
   a sampling circuit for sampling the reverse broadband RF signal to generate a sampled signal;
   a linear sweep generator for generating a ramp waveform;
   a comparator for comparing the ramp waveform and the sampled signal and for generating an output signal when the ramp waveform is equal to the sampled signal;
   logic for terminating generation of the ramp waveform by the linear sweep generator in response to reception of the output signal from the comparator; and
   a pulse generator for driving the optical source based upon duration of the ramp waveform.

2. The communication system of claim 1, further comprising:
   a head end section for generating a forward optical signal; and
   a converter for converting the forward optical signal into a plurality of forward RF signals for transmission to subscribers of the communication system.

3. The communication system of claim 1, wherein the optical source comprises a laser diode.

4. The communication system of claim 2, further comprising:
- a photoelectric detector for receiving the reverse optical signal and recovering therefrom the reverse broadband RF signal, wherein the reverse broadband RF signal is further processed by the head end section to recover information encoded therein.

5. A cable television system, comprising:
- a head end section for transmitting a forward optical signal;
- a converter for converting the forward optical signal to a plurality of forward RF signals for transmission over branches of the cable television system;
- taps located along the branches of the cable television system for routing portions of the plurality of forward RF signals to subscriber equipment;
- a node for receiving a reverse broadband RF signal from the subscriber equipment and for pulse width modulating the reverse broadband RF signal via an optical source to generate a reverse optical signal for transmission to the head end section, the node comprising:
  - a sampling circuit for sampling the reverse broadband RF signal to generate a sampled signal;
  - a linear sweep generator for generating a ramp waveform;
  - a comparator for comparing the ramp waveform and the sampled signal and for generating an output signal when the ramp waveform is equal to the sampled signal;
  - logic for terminating generation of the ramp waveform by the linear sweep generator in response to reception of the output signal from the comparator; and
  - a pulse generator for driving the optical source based upon duration of the ramp waveform.

6. The cable television system of claim 5, wherein the converter is included within the node.

7. The cable television system of claim 5, wherein the reverse broadband RF signal includes video information.

8. The cable television system of claim 5, wherein the reverse broadband RF signal includes data information.

9. The cable television system of claim 5, wherein the reverse broadband RF signal includes voice information.

10. The cable television system of claim 5, wherein the node comprises:
- the optical source for generating the reverse optical signal, which is characterized by pulses having durations that are proportional to amplitudes of the reverse broadband RF signal.

11. The cable television system of claim 5, wherein the optical source comprises a laser diode.

12. The cable television system of claim 5, further comprising:
- a photoelectric detector for receiving the reverse optical signal and recovering therefrom the reverse broadband RF signal, wherein the reverse broadband RF signal is further processed by the head end section to recover information encoded therein.

* * * * *

UNITED STATES PATENT AND TRADEMARK OFFICE
CERTIFICATE OF CORRECTION

PATENT NO. : 6,457,178 B1
DATED : September 24, 2002
INVENTOR(S) : Slim

It is certified that error appears in the above-identified patent and that said Letters Patent is hereby corrected as shown below:

<u>Title page,</u>
Item [57], ABSTRACT,
Line 1, delete "ahead" and insert therefore -- a head --.

Signed and Sealed this

Twenty-fifth Day of March, 2003

JAMES E. ROGAN
*Director of the United States Patent and Trademark Office*